United States Patent [19]
Giesemann

[11] Patent Number: 5,431,996
[45] Date of Patent: Jul. 11, 1995

[54] COMPOSITE MATERIAL

[75] Inventor: Herbert Giesemann, Lugano-Carona, Switzerland

[73] Assignee: Mondern Ecological Products, A.G., Zug, Switzerland

[21] Appl. No.: 18,247

[22] Filed: Feb. 16, 1993

[30] Foreign Application Priority Data

Feb. 15, 1992 [DE] Germany .................. 42 04 583.5

[51] Int. Cl.⁶ .............................. D04H 1/58
[52] U.S. Cl. ................... 428/288; 106/600; 428/285; 428/256; 428/289; 428/325; 428/331; 428/446; 428/450; 428/452
[58] Field of Search ............ 428/283, 284, 285, 289, 428/408, 260, 262, 268, 273, 288, 367, 446, 450, 452, 256, 325, 331; 106/600, 603, 605

[56] References Cited

U.S. PATENT DOCUMENTS

| | | | |
|---|---|---|---|
| 4,092,101 | 5/1978 | Dillmann | 8/18 R |
| 4,332,600 | 6/1982 | Wegerhoff et al. | 65/2 |
| 4,822,420 | 4/1989 | Burkhardt et al. | 106/74 |
| 5,298,068 | 3/1994 | Giesemann | 106/604 |

*Primary Examiner*—James J. Bell

[57] ABSTRACT

This invention is directed to a composite material of one or more preformed reinforcement materials co-influencing the final shape and made of tension-resistant organic and/or inorganic material, a second material of alkali water glass and a finely disperse mineralic filler, with hardening having been effected by drying at 80° to 120° C., or by drying at 80° to 120° C. and subsequent tempering at 400° to 700° C. The process for producing said composite material and its use as a fire-proof, bending tension-resistant construction element formed as desired is disclosed.

27 Claims, 7 Drawing Sheets

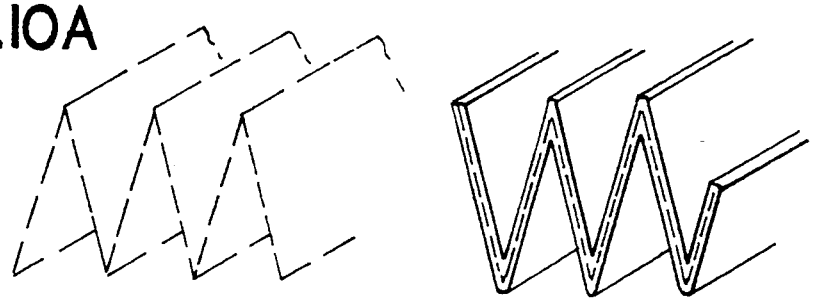
FIG.10A  FIG.10B
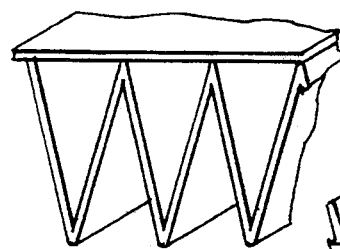 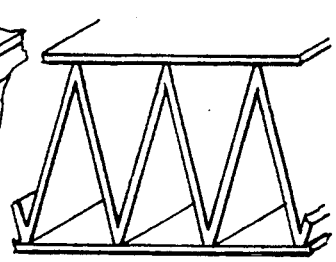 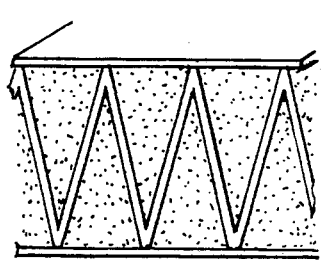
FIG.10C    FIG.10D    FIG.10E
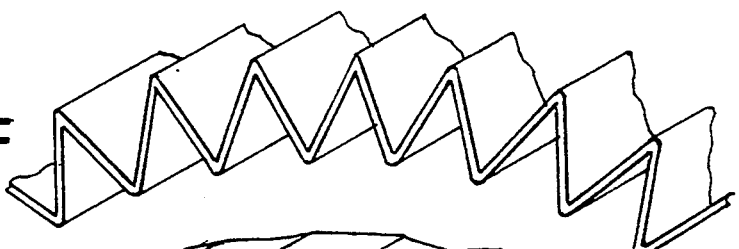
FIG.10F
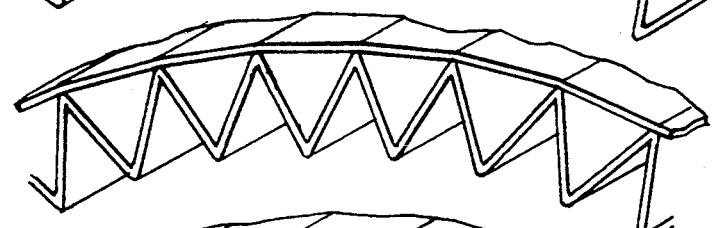
FIG.10G
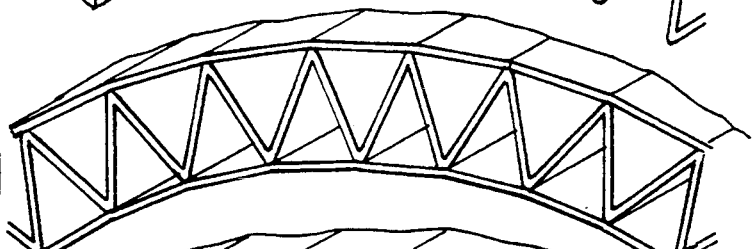
FIG.10H
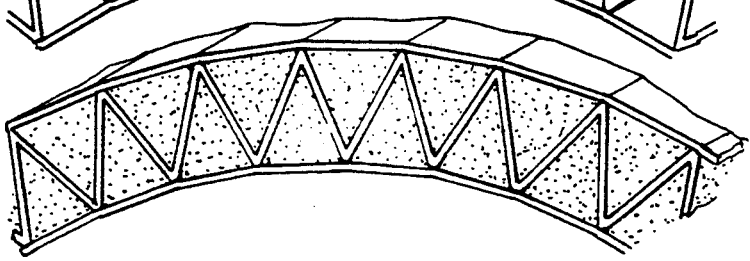
FIG.10I

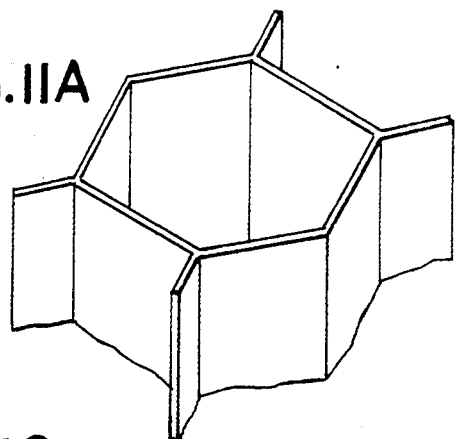
FIG.11A
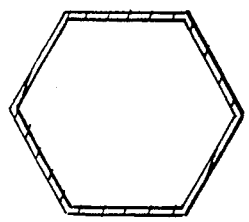
FIG. 11B
FIG.11C
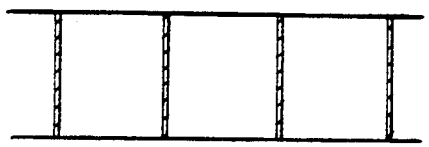
FIG. 11D
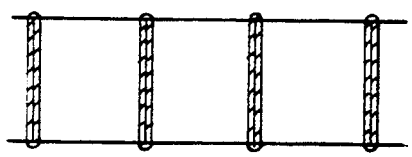
FIG.11E
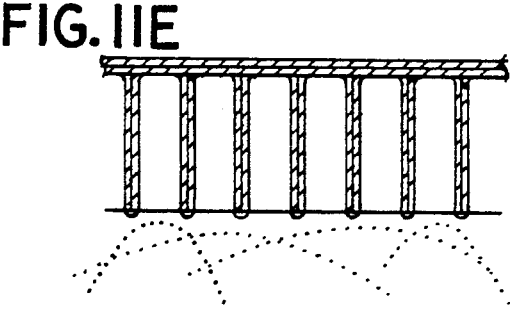
FIG.11F
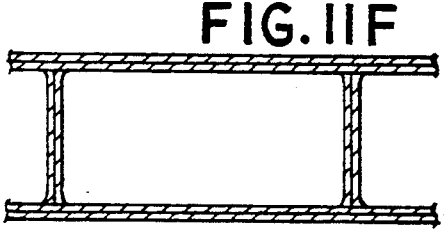
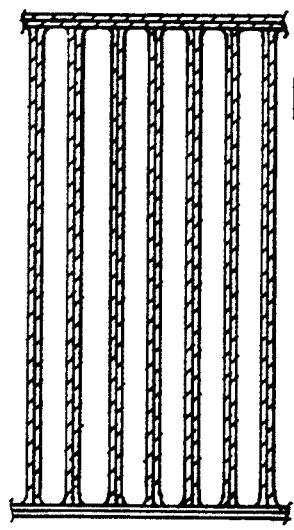
FIG.11G
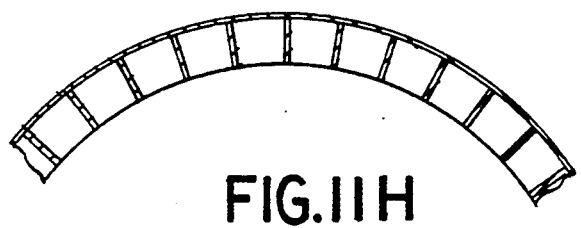
FIG.11H

COMPOSITE MATERIAL

This invention is directed to a fire-proof, arbitrarily molded composite material having bending tensile strength, the process for its manufacture and its use.

BACKGROUND OF THE INVENTION

It has long been known to protect building slabs from fire or high temperatures by providing their surfaces with alkali silicate paints optionally containing finely divided fillers such as slate flour (DE-AS 11 98 271) or other mineral flours DE-AS 14 71 020, DE 35 12 515). Also, known is the use of fire-protective slabs made of alkali silicates prepared by embedding silicate fibers into a layer of a silicate solution, optionally incorporating reinforcements of metal wire, and subsequently solidifying the layer by removal of water at elevated temperatures (DE-AS 14 71 005). In both cases, the water content of the slabs is high enough to allow formation of a foam layer of water glass which keeps heat away from the underlying structure in case of fire. However, due to their water content, such slabs, do not have sufficient weathering resistance and bending tensile strength. When used on external surfaces, they must be protected from water exposure by protective coatings.

Anhydrous coatings resistant to chemical, thermal and mechanical exposure are described in DE-OS 34 10 844. This specification discloses a coating mass made up of water glass, quartz, clay, lavalite, magnesium silicate, pumice, cement, and water which is applied to articles to be coated such as tank containers, water processing plants, pipelines, ships, and concrete buildings. Subsequent to prehardening, the mass is subjected to a fire melt treatment at temperatures of from 400° to 1,900° C.

DE-AS 27 32 387 describes a process for manufacturing insulating building slabs, wherein a slab of mineral fiber, prebound with an organic binder and having a density of 0.2 g/cm$^3$, is soaked with an aqueous slurry of a binding clay. This is then subsequently dried at temperatures above 105° C. and then tempered above 400° C., with the temperature being maintained below the transformation temperature of the mineral fiber used. In such a process, one begins by using a slab of mineral fiber having a density as high as possible to obtain appropriate resistance properties. Thus, this process suffers from the drawback that mechanical strength must be achieved by employing high density material. Solutions to the problem of protecting building components from fire, linings or coatings for the articles to be protected have been constantly proposed.

SUMMARY OF THE INVENTION

This invention is based on the need to solve the technical problem of developing a novel material which allows construction in fire-proof fashion, of self-contained molded articles capable of being manufactured in any form, having inherent stability, bending tensile strength, and depending on the application, weather resistance.

The material should be environmentally compatible and manufacturable from readily available raw materials. In any case, it should be re-usable (recyclable). In particular, it should not emit fibers, especially asbestos fibers, or toxic substances, or toxic gases such as dioxins, furans or formaldehyde, into the environment. It should allow for maximum economic efficiency with respect to material expenditure in relation to mechanical performance (corresponding to the examples in nature), and it should be manufacturable with a low energy expenditure. In order to achieve maximum durability, it should have as high a resistance as possible with respect to exposure to aggressive environmental factors such as acid rain, water, water vapor, acidic and basic chemicals, UV radiation, and pests from fauna and flora.

Finally, it should have maximum long-term temperature resistance, incombustability, no formation of fumes, no melt-away, no emission of toxic gases and thus, maximum fire resistance.

This technical problem is solved by a composite material containing preformed reinforcement materials which may be in the form of fibers, fiber bundles, fabrics, non-wovens, fiber mats, wire meshes, perforated or non-perforated sheets, sheet metal or plates. The reinforcement materials may be present in distorted, folded or twisted form, so as to provide the composite material of the invention with, in addition to form, good mechanical strength, particularly tensile strength. Preferably, the reinforcement materials are employed with a thickness of from 0.5 to 1 mm.

Suitable as tension resistant materials for the material of the invention are hemp, cotton, jute, flax, silk, wool, cellulose products such as kraft paper and kraft cardboard, plastic or foamed plastic such as polyester, polyamide, polyethylene, polypropylene, polystyrene, polyurethane, poly(vinyl chloride), phenol formaldehyde resin, or melamine formaldehyde resin. According to the invention, the foamed plastic can be used as a foamed plastic article, preferably in the form of a slab. As tension resistant inorganic reinforcement materials, there may be used materials made of glass, textile glass, E- and S-glass, basalt minerals, ceramics, oxide ceramics, carbon, quartz, graphite, boron nitride, boron, silicon carbide, aluminum, and steel. Thus, as the reinforcement materials being coated and/or soaked with the inorganic medium, not only aluminum sheets, steel sheets, fiber mats of glass fiber or mineral fiber, non-wovens of glass fiber, steel fiber or plastic fiber, but also fabrics such as cloths, tarpaulin sheets, alkali resistant plastic fabrics, plastic-coated fabrics, or carbon fiber fabrics can be used. As the preformed reinforcement material, it is also possible to use fibers of various materials bonded with alkali water glass or wire pieces bonded with water glass.

The second component of the composite material is either alkali water glass or alkali water glass mixed with a finely a dispersed mineralic filler such as alumina, silica, zirconia, titanium dioxide, graphite, red mud, quartz flour, clay cement, kaolin or mixtures thereof. Red mud being a waste product in aluminum production is particularly favorable with respect to costs. In addition to these examples given, all of the mineralic fillers known to the artisan which have melting points above approximately 1,300° C., and preferably above 1,800° C., or mixtures thereof may be used within the scope of the invention. Furthermore, it is possible to replace part of the filler by a waste difficult to recycle such as PVC powder and/or PVC granulates from waste. For the purpose of the invention, the grain size of the fillers should be between from 1 to 30 μm. The fillers must be free from impurities, and they must be mixed thoroughly with the aqueous alkali water glass solution. As the alkali water glass, sodium and/or potassium water glass having a density of 35–40 degrees Baumé is used.

The viscosity of these water glasses, or the suspensions of filler in these water glasses, is of great practical importance. Care is taken to ensure the complete wetting of the filler particles. As viscosity may be lowered by increasing the temperature, processing at elevated temperatures may be convenient. The composite articles thus obtained preferably has a material thickness of from 2 to 4 mm.

Furthermore, this invention is directed to the process for manufacturing the composite material, the process having substantial co-influence on the properties of the material. The manufacture of the composite material of the invention is described below in more detail.

The composite material is prepared by completely coating and/or impregnating the preformed reinforcement material using sodium and/or potassium water glass solution having a water level of from 5 to 30% by weight, then drying at temperatures of from 90 to 105° C. and subsequently tempering at temperatures of from 400° to 700° C. In this fashion, bending tension resistant, completely anhydrous composite materials capable of resisting temperatures of up to approximately 800° C. are obtained, since chemically bound water is removed by the tempering according to the invention. Hence, such composite materials are resistant to weathering and may be used as construction elements on external surfaces. For example, when coating non-woven fabric or glass fabric using aqueous sodium silicate solution, a stable transparent slab having a thickness of only 2–4 mm is obtained after drying and tempering.

Composite materials being temperature resistant up to approximately 1,600° C. are obtained when the preformed reinforcement material is coated and/or impregnated using a suspension of from 90 to 10% by weight of aqueous alkali water glass solution and from 10 to 90% by weight of finely dispersed mineralic filler. If these composite materials are hardened by merely drying at 90° to 105° C., only the free water is removed and from about 5 to about 15% of water is still contained in the material. Such composite materials may be used in all those cases where water resistance is not required as, for instance, in the completion of interior construction.

If the composite materials obtained by coating and/or impregnating with the inorganic suspension and drying are subsequently tempered at from 400° to 700° C., composite materials having good resistance to pressure, good tensile and bending tensile strength are obtained which are heat resistant and dimensionally stable and, in addition, are anhydrous. They resist both short-term heat exposure, in case of fire (1,200° C.), and sustained exposure at from 1,200° to 1,600° C., i.e., they are highly fire resistant. Thus, the composite materials of the invention, in addition to good mechanical properties, possess the advantageous properties of ceramic materials such as incombustability, resistance to chemicals, UV radiation, animal and plant pests. Moreover, the obtained composite materials are environmentally compatible and may be prepared from readily available raw materials.

Coating and/or impregnating the preformed reinforcement materials effected according to the invention using the alkali water glass solution, or the suspension, may be carried out using all the common methods known to the artisan such as, for instance, knife coating, painting or spraying. In the most simple variant, the preformed material is immersed into the alkali water glass solution or the suspension. Depending on intended use, the coating may be effected on one or on all sides.

In order to achieve coatings/impregnations of any desired thickness, the steps of coating, impregnating and drying may be repeated once, or several times, without filler or with varying concentrations of filler in the suspension as well. In this fashion, similar composite materials may be prepared, the reinforcement materials of which are initially coated or impregnated with alkali water glass solution and subsequently dried at from 90° to 105° C., then coated/impregnated with the suspension, again dried at from 90° to 105° C., and then tempered at from 400° to 700° C.

When repeating this coating/impregnating, other tension resistant reinforcement materials such as, for instance, mats made of glass, silk fabric or glass non-woven, but also metal foils may be incorporated at the same time. Thus, composite materials of two or more initially preformed reinforcement materials may be prepared, where reinforcement materials of the same type, for example, either solely organic or solely inorganic materials, or different materials as well, may be combined which, after coating/impregnating with the alkali water glass solution or the suspension, and placing them on top of each other prior to drying and tempering, are compressed using slight pressure.

Drying the composite material of the invention may be effected in a drying oven, e.g., by microwaves, or by infrared radiation. On the average, the drying period is from 5 to 20 minutes, depending on water content of the alkali water glass solution and the concentration of filler.

Preparation of the composite material of the invention also may be carried out in that, subsequent to coating or impregnating the preformed material, drying for a short period of time is effected to remove only some of the free water; then the material is formed once again and thereafter is subjected to final drying and optional tempering.

Tempering at 400° to 700° C. is conducted for a short time of from 10 to 60 seconds. Here, some of the reinforcement materials used according to the invention such as plastics melt without liberating gases or fumes because, due to the gas tight impregnation with the inorganic medium, the oxygen for combustion cannot reach the plastic. Thus, for example, if a slab of foamed plastic is impregnated with the inorganic suspension, dried and tempered at temperatures of between 400° to 700° C., the foamed article melts on tempering but the inorganic coating withstands these temperatures so that the slab retains its external shape.

The final shape of the composite material is also influenced by the form of the reinforcement material and ranges from flat slabs, via distorted, folded or twisted surfaces, to round or special section pipes.

It has been found that for continuous production of the composite materials of the invention in the form of slabs, the known coating plants for plastic fiber webs with their production technology are suitable. It is merely necessary to extend the production line by one drying oven capable of generating 400° to 700° C.

The composite materials of the invention find application in various fields such as fire and bending tension resistant construction elements. Thus, for example, the large surface construction elements manufactured according to the invention may be used as lowered ceilings in rooms for business and industry. In addition to fire security, these construction elements must have high a inherent rigidity and low specific weight.

If fabrics such as table cloths, tarpaulin sheets, plastic fabrics or the like are coated with inorganic medium according to the invention, bending tension resistant, thin, incombustible slabs are produced which may be used as wall panellings or floor coverings in interior completion.

Furthermore, the composite materials produced according to the invention may be assembled into various construction elements by allowing the suspensions to flow into each other, then drying and tempering so that no "weld seam" is to be seen on the construction elements.

BRIEF DESCRIPTION OF THE DRAWINGS

These and other aspects of the present invention are apparent from the following drawings, in which:

FIGS. 10A-10I illustrate reinforced embodiments according to the present invention;

FIGS. 11A-11H illustrate honeycomb embodiments according to the present invention;

DESCRIPTION OF THE PREFERRED EMBODIMENT

The following examples are preferred embodiments and, together with FIGS. 1 to 18, demonstrate possible applications of the invention.

EXAMPLE 1

Flat Slab

Figure 1:
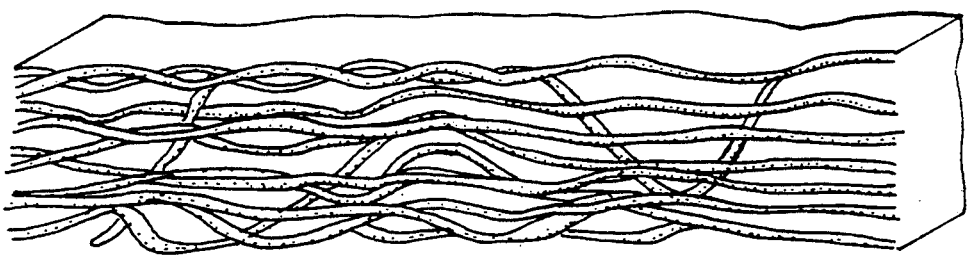
FIG. 1 illustrates a non-woven fabric according to the present invention.
Figure 2:
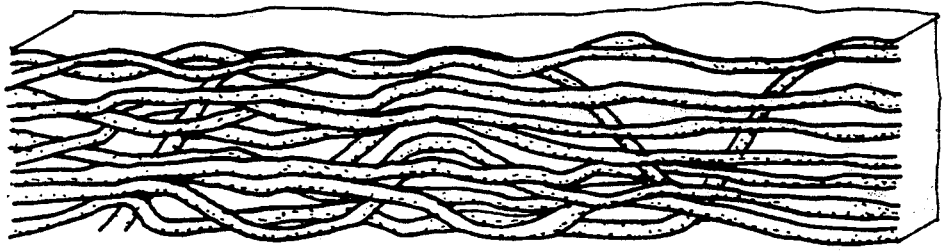
FIG. 2 illustrates the non-woven fabric of FIG. 1 after immersion and drying according to the present invention.

A non-woven fabric having a thickness of 1 mm and the dimensions 1.0/1.0 m is chosen, the fiber characteristic of which is illustrated in FIG. 1. All the fibers are mostly composed of numerous single fibers having a thickness of 1-20 μm, in a twisted fashion. This non-woven is immersed for some seconds into a sodium silicate solution of 37 Baumé, having a low water content of 20-30% by weight, then taken out and dried in an oven at 90° to 100° C. The non-woven shows a substantial increase in weight since the solution has been incorporated in the interspaces of the numerous interior fibers of the non-woven (FIG. 2). Thus, the non-woven has been substantially reinforced with respect to mechanical properties, in particular, resistance to pressure. Subsequently, this fiber slab is immersed into a suspension having the following composition:

50% by weight of sodium silicate
40% by weight of aluminum oxide
10% by weight of water After removal, a small portion of suspension drains off, and the slab again is dried in an oven as above. After drying, this slab has complete inherent stability. Depending on the size of the interspacings between the main fibers and the viscosity of the suspension, all the interspacings will be filled in the best case. If this is not the case, impregnating and drying are repeated once again, using a more viscous suspension, if necessary.

Figure 3:
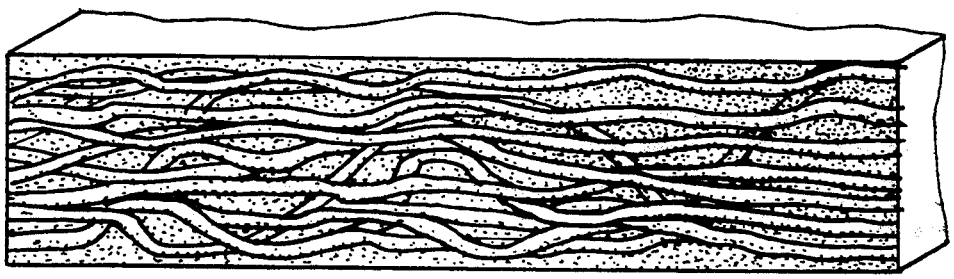
FIG. 3 illustrates the dried fabric of FIG. 2 after a heat treatment according to the present invention.

The slab has a continuously sealed, dense surface on all sides but still contains residues of chemically bound water. In order to evaporate these last residues, the slab is subsequently subjected to a temperature treatment of 400° C. in an oven. Thus, the last residues of water vaporize, the slab is completely anhydrous and hence, hard and stable and insoluble in water (FIG. 3). Such waterproofness is important for an application such as external building panels.

Figure 4:
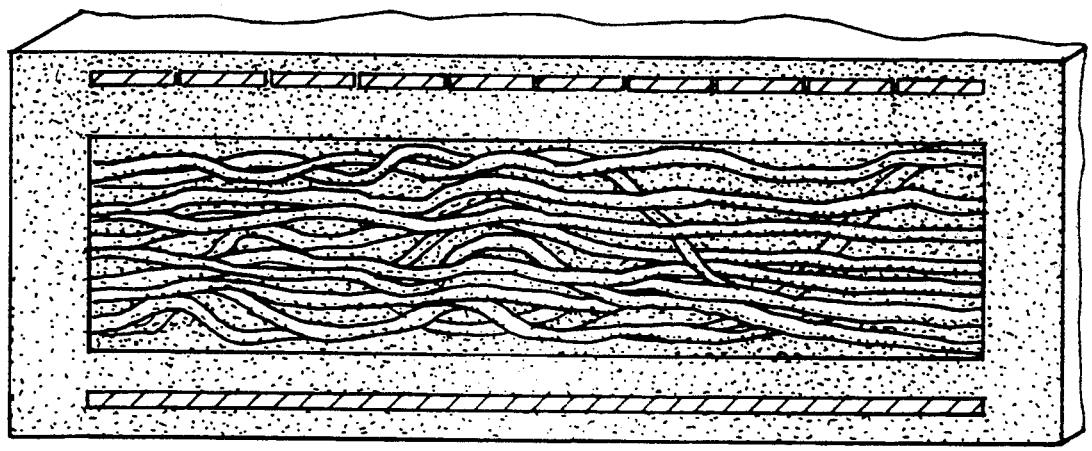
FIG. 4 illustrates the heat treated fabric of FIG. 3 after application of a coating according to the present invention.

If this slab is to have an even greater inherent stability and increased fire resistance, it once again may be coated with a layer of, e.g., 0.5 mm in thickness of this suspension on one or more sides, dried and tempered, with optional incorporation of additional tension resistant reinforcement materials such as sheets, sheet metal, or perforated film sheet metal (FIG. 4).

EXAMPLE 2

T-Piece

Onto a sheet metal surface, 1.05 m×1.05 m with lateral flanging, being coated, the PTFE, glass fibers E-glass or S-glass fibers of 2-200 mm in length and, e.g., from 0.001 to 0.5 mm in thickness, are piled up in such fashion that the fibers within one layer are oriented in all directions. Optionally, 2-4 further layers are applied onto this layer. Then, a steel wire fabric, 1.05 m×1.05 m, the wires of which being likewise coated with PTFE, is placed on top to prevent swirling when subsequently spraying with aqueous sodium silicate solution through nozzles. Subsequent to this uniform wetting, the slab is briefly dried in an oven, or by infrared radiation, or by microwaves, at 100° C. After this brief drying, a completely rigid, inherently stable body has formed, wherein all fibers are distributed in all directions with different sizes. The short fibers, for example, those of 2-3 mm in length, may be, or even are, intended to be oriented vertically within the body in order to be capable of absorbing future internal shearing forces. Depending on fiber thickness and numbers of layers, this formed body will have a thickness of 2-3 mm.

In order to improve fire resistance, this inherently stable slab is coated on all sides with a suspension according to Example 1, in a thickness of 0.5 to 1 mm, dried and tempered as in Example 1.

A fire resistance test at a temperature of 1,200° C. does not result in any change in slab volume.

Figure 5:
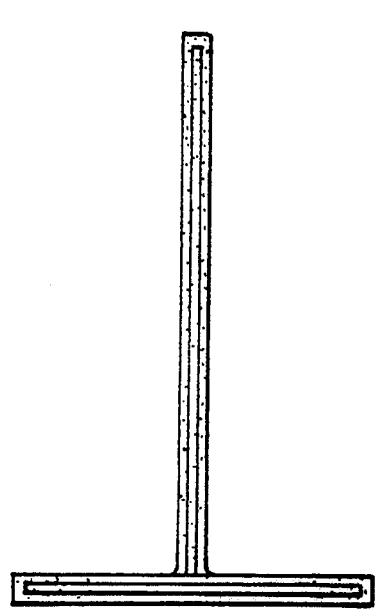
FIG. 5 illustrates an embodiment of a construction element according to the present invention.

By welding such two slabs perpendicularly to each other, a T-piece is obtained (FIG. 5).

Figure 6:
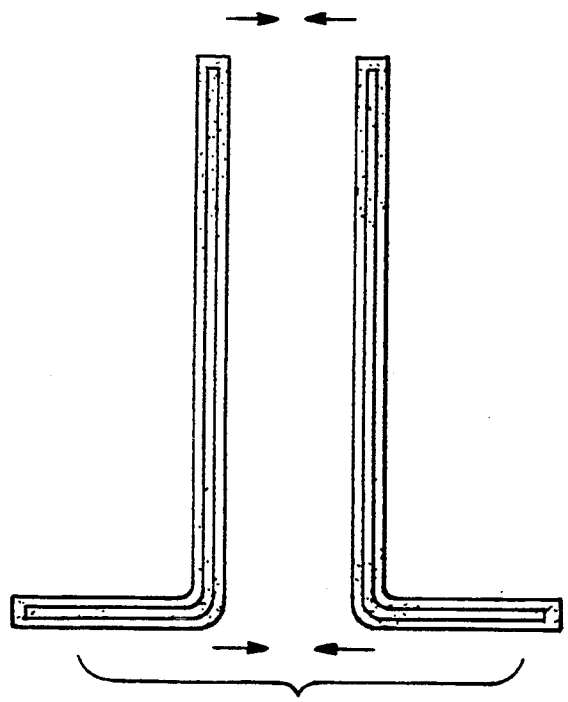
FIG. 6 illustrates joining together two formed bodies according to the present invention.
Figure 7:
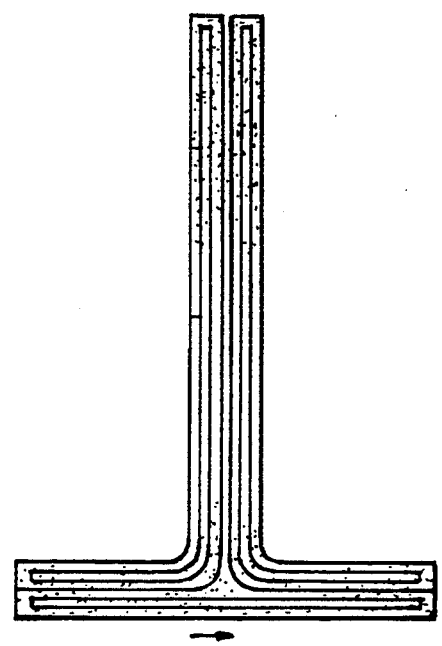
FIG. 7 illustrates another embodiment of a construction element according to the present invention.

By welding two bent formed bodies according to FIG. 6 and additionally reinforcing the bottom side with a slab, a construction element according to FIG. 7 is obtained.

Figure 8:
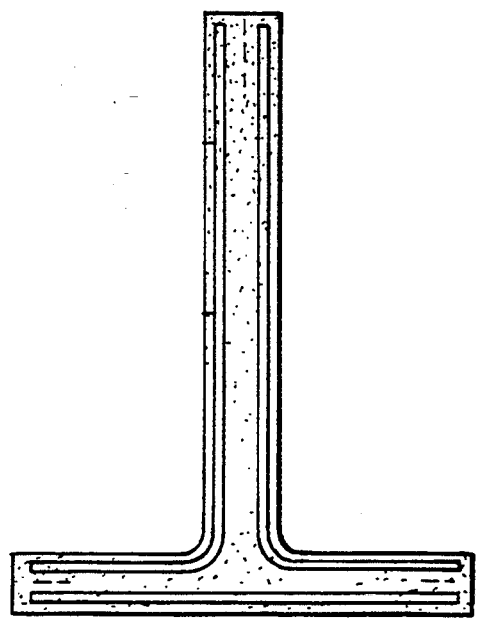
FIG. 8 illustrates a monolithic construction element according to the present invention.
Figure 9A:
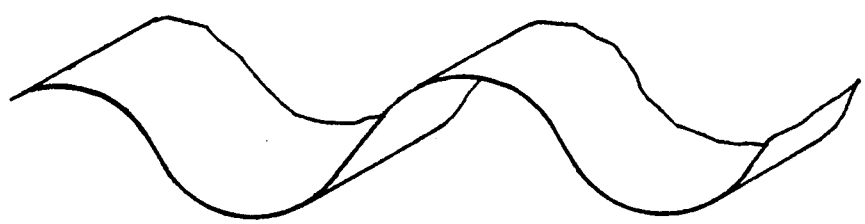
FIGS. 9A-9E illustrate formed embodiments according to the present invention.
Figure 9B:
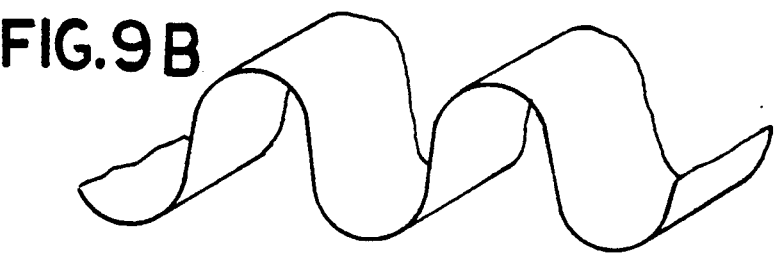
Figure 9C:
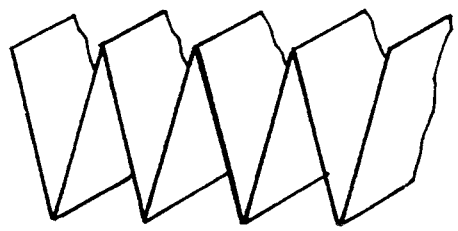
Figure 9D:
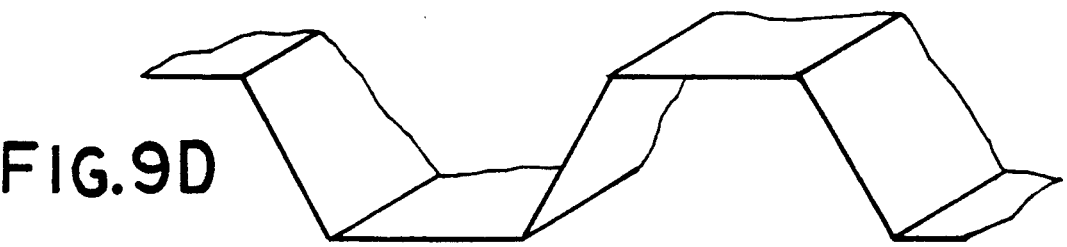
Figure 9E:
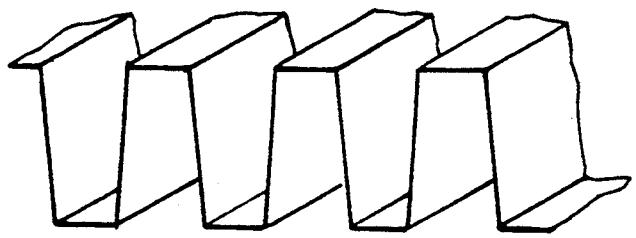
Figure 12:
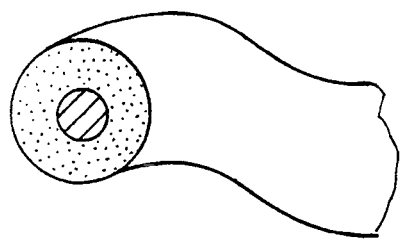
FIG. 12 illustrates a compact bar embodiment according to the present invention.

Another possibility in producing such a T-piece is the production in one cast by flow of the suspensions into each other (FIG. 8).

EXAMPLE 3

A reinforcement material in the form of a sheet or mat is coated with a suspension according to Example 1 and subsequently pre-dried at 85° C. for 3 minutes. Now, since the suspension still is sufficiently pasty, the coated material is formed into the final shape using a matrix, patrix or by continuous slight pressure from both sides according to the gearwheel principle, dried at 100° C. for 15 minutes, and tempered at 600° C. for 60 seconds. Possible shapes created in this fashion are illustrated in FIGS. 9A to E.

EXAMPLE 4

Zig-Zag Formed Bodies

In this example, organic cellulose media or non-wovens are employed as tension resistant reinforcement materials.

Kraft paper is completely impregnated using an aqueous sodium silicate solution, then dried at a temperature of from 80° to 100° C., followed by coating with a suspension as described in Example 1 from all sides to a thickness of preferably from 0.3 to 0.5 mm. Optionally, 2–4 layers of kraft paper are impregnated and coated, and pressed against each other with pressing out all of the air bubbles.

Then, pre-drying is effected in a continuous-flow oven at 100° C. so that when using, in this thin formed body, not only a flat slab may be formed but other formations would also be possible such as, for instance, bending in at least one direction by 90° or, as illustrated in FIGS. 10B and 10F, to give a zig-zag form. Such zig-zag form has most favorable inherent rigidity and bending tensile strength, respectively, in a longitudinal direction. Such a predominantly inorganic formed body preferably may be used as a lowered ceiling in industrial halls of 10 m or more in length. If such a zig-zag formed body is provided with a slab of kraft paper layers on one or two sides as explained above (FIGS. 10C, D, G, H), inherently highly stable fire-proof construction elements of three-dimensional formed bodies are produced which have good values of mechanical strength. They have very low weight in relation to overall volume, and very high inherent stability. For the purpose of using these formed bodies as self-containing construction elements as cold or heat insulation, the cavities may be filled with insulation material of very low bulk density (FIGS. 10E, I).

Of course, zig-zag formed bodies may also be manufactured using kraft paper which already is appropriately preformed (FIG. 10A), followed by coating, drying and optional tempering.

EXAMPLE 5

Honeycomb Formed Bodies

Honeycomb products are on the market as kraft paper or recycling paper but are also made of plastic and aluminum. Most certainly, recycling paper is economical. The commercially usual dimensions show large variability. The hexagon honeycombs may have a diameter of from 3 to 100 mm, the wall thickness constantly is only from 0.09 to 0.15 mm, the thickness may be 3 mm but also may be up to 500 mm or more (FIGS. 11A, B, C).

A slab of these kraft paper honeycombs having a honeycomb diameter of 20 mm, a thickness of 30 mm, length and width 1 m is immersed in a sodium silicate solution and then is dried initially at 100° C. and then completely dried at 400° C. Thereafter, the slab has considerable strength (FIG. 11D). In the next step, it is provided from one side with a covering layer (FIG. 11E) consisting of 1 or 2 sheets of kraft paper as produced according to Example 4 and is coated on both sides with a suspension according to Example 1 of from 0.5 to 1.5 mm. Bonding is effected by welding the inorganic adhesive media.

Considerable strength is achieved by attaching the flat formed body on one side. The weight is very low. Such a slab is used, for instance, in lowered ceilings, with the open, cell-like side being directed downward to the room. The bottom side absorbs air sound waves by means of the cell structure with its narrow walls (FIG. 11E).

Similarly, honeycombs of different diameter and different thickness may be assembled.

Should a fire break out in the room, the flames will reach the honeycombs impregnated by the sodium silicate at the lowered ceiling. If these have been dried at only 100° C., they have between 15 and 30% by weight of water. In case of fire, a glass foam will form resisting heat transfer. The support slab having the all-side 1.0 mm layer of alkali water glass and filler is not affected by the flames, i.e., is volume-stable to 1200° C. A decisive fact is that the inorganic covering of the slab at such temperatures has become only harder due to the fillers added.

If however, for such a case of fire it is intended to retain the honeycombs, they must be coated once again with a suspension according to Example 1 to a thickness of from 0.5 to 1.5 mm on all sides subsequent to the initial impregnation.

Again, if the honeycombs are coated on both sides with a flat formed body, for example, kraft paper having been impregnated with a suspension according to Example 1, a fire-resistant, self-containing construction element having low weight suitable for a large free span of from 5 to 25 m (FIGS. 11F, G) and with possible application in building industry and construction of vehicles is obtained. A surprising fact in using these honeycombs is the flexibility of the honeycombs in all directions (FIG. 11H). With their aid, it is possible to produce the most sophisticated construction elements. For the time being, such inorganic formed bodies cannot be made by any other process in such a simple manner.

EXAMPLE 6

Bar, Tube

A longish, fibrous reinforcement material (e.g., a metal rope or a rope of sisal hemp) is impregnated using a suspension of aqueous potassium water glass solution and red mud, dried at 100° C. for 10 to 20 minutes, and subsequently tempered at 600° C. for 20 seconds. A composite material is obtained in the form of a compact straight or bent bar (FIG. 12) being heat resistant up to 1400° C.

Figure 13:
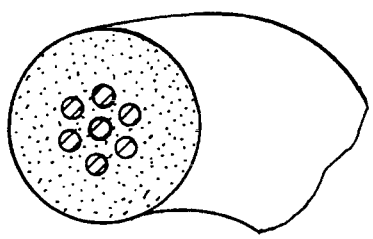
FIG. 13 illustrates a twisted rope embodiment according to the present invention.
Figure 14:
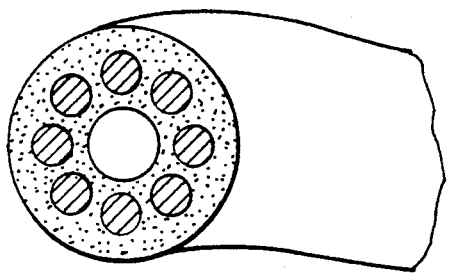
FIG. 14 illustrates a tube embodiment according to the present invention.
Figure 15:
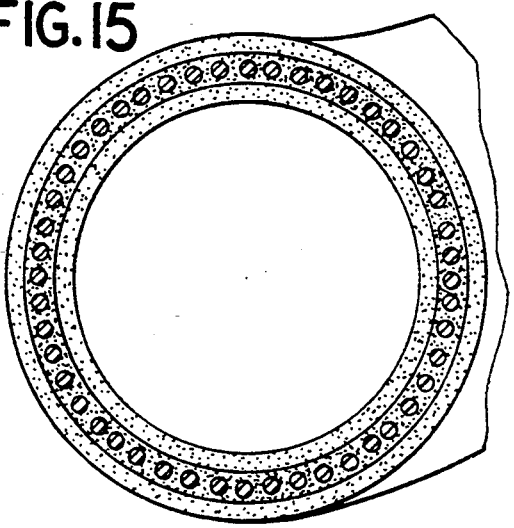
FIG. 15 illustrates an enlarged tube embodiment according to the present invention.
Figure 16:
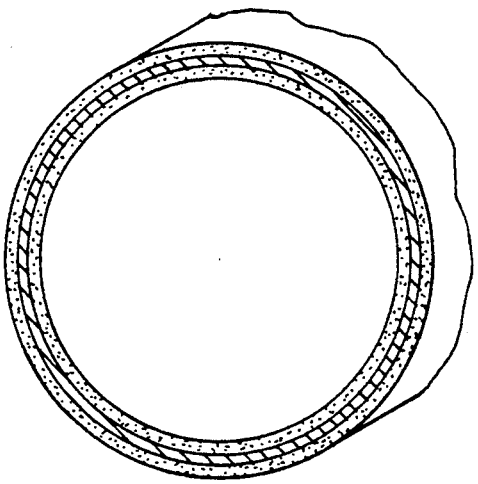
FIG. 16 illustrates another enlarged tube embodiment according to the present invention.
Figure 17:
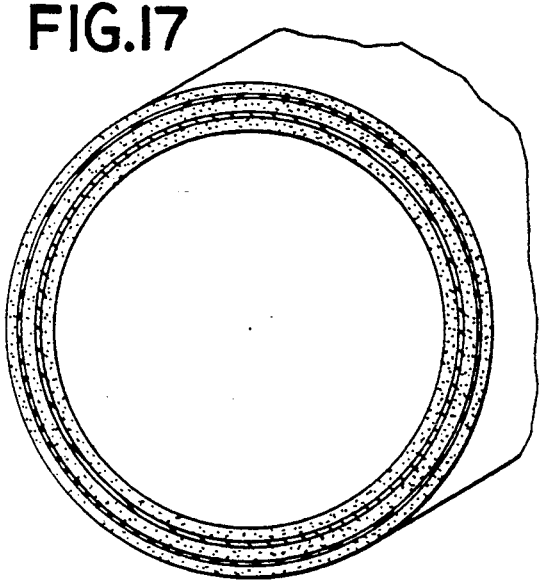
FIG. 17 illustrates a reinforced enlarged tube embodiment according to the present invention.

If several twisted ropes are used as the reinforcement material, a composite material is obtained according to the process described which has even better bending tensile strength (FIG. 13). If several ropes are wound helically around a cylinder, a cavity is formed at the center and, following impregnation, drying and tempering, a tube (FIG. 14) is obtained which, according to FIGS. 15 to 17, may be enlarged and/or reinforced as desired. Thus, the tube illustrated in FIG. 17 already resists higher internal pressure.

Figure 18A:
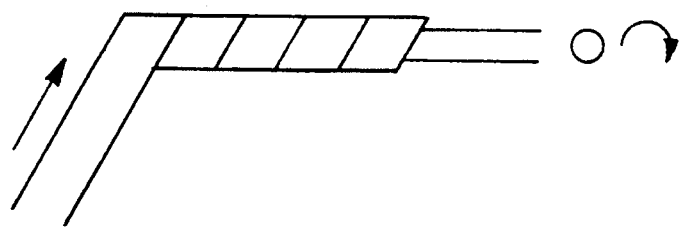
FIG. 18A-18B illustrates an auxiliary core embodiment according to the present invention.
Figure 18B:
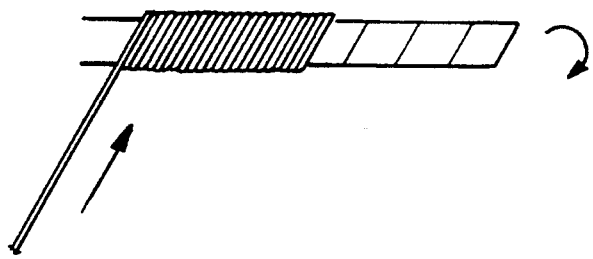

Another possibility in producing tubes is to helically wind one or more wires or ribbons around an auxiliary core which is removed subsequently. The helical tube thus prepared serves as a preformed reinforcement material and subsequently is coated with the suspension (FIG. 18 A and B).

As can be seen from the examples, the problem of the invention is solved in excellent fashion. The novel composite material may also be used in building construction (particularly sky scrapers), construction of land, marine and airborne craft, and construction of machines, plants and furniture.

What is claimed is:

1. A composite material comprising:
    at least one preformed reinforcement material co-influencing a final shape of the composite material, said preformed reinforcement material comprising at least one member selected from the group consisting of tension-resistant organic material and tension-resistant inorganic material; and
    a hardened material comprising alkali water glass, wherein said hardened material coats the preformed reinforcement material and is hardened by drying at 90° to 105° C.

2. The composite material of claim 1 wherein the at least one preformed reinforcement material comprises at least one member selected from the group consisting of hemp, cotton, jute, flax, silk, wool, cellulose and plastic.

3. The composite material of claim 2 wherein the plastic comprises at least one member selected from the group consisting of polyester, polyamide, polyethylene, polypropylene, polystyrene, poylurethane, poly(vinyl chloride), phenol formaldehyde resin and melamine formaldehyde resin.

4. The composite material of claim 1 wherein the preformed reinforcement material comprises at least one inorganic material selected from the group consisting of glass, carbon, quartz, graphite, boron nitride, silicon carbide, aluminum, steel, oxide ceramics and basalt mineral.

5. The composite material of claim 1 wherein the preformed reinforcement material is provided in at least one form selected from the group consisting of fiber bundles, fabrics, non-wovens, fiber mats, wire meshes, perforated sheets, non-perforated sheets, sheet metal, sheet plates, fibers bonded with the alkali water glass and wire pieces bonded with alkali water glass.

6. The composite material of claim 2 wherein the preformed reinforcement material of plastic comprises a foamed plastic article.

7. The composite material of claim 1 wherein the preformed reinforcement material is provided in at least one form selected from the group consisting of a mat and a fabric, said mat comprising at least one member selected from the group consisting of glass fiber and mineral fiber, said fabric comprising at least one member selected from the group consisting of plastic fabric and plastic-coated fabric.

8. The composite material of claim 1 wherein the alkali water glass comprises at least one alkali water glass selected from the group consisting of sodium water glass and potassium water glass.

9. The composite material of claim 1 wherein the hardened material further comprises finely dispersed mineralic filler comprising at least one member selected from the group consisting of alumina, silica, zirconia, titanium dioxide, graphite, red mud, quartz flour, clay cement and kaolin, the finely dispersed mineralic filler having an average grain size of from 1 to 30 μm.

10. A composite material comprising:
    at least one preformed reinforcement material co-influencing a final shape of the compositie material, said preformed reinforcement material being made of at least one member selected from the group consisting of tension-resistant organic material and tension-resistant inorganic material; and
    a hardened material comprising alkali water glass and a finely dispersed mineralic filler, wherein said hardened material coats the preformed reinforcement material and is hardened by drying at 90° to 105° C.

11. The composite material of claim 10 wherein the at least one preformed reinforcement material comprises at least one member selected from the group consisting of hemp, cotton, jute, flax, silk, wool, cellulose and plastic.

12. The composite material of claim 11 wherein the plastic comprises at least one member selected from the group consisting of polyester, polyamide, polyethylene, polypropylene, polystyrene, poylurethane, polyvinylchloride, phenol formaldehyde resin and melamine formaldehyde resin.

13. The composite material of claim 10 wherein the preformed reinforcement material comprises at least one inorganic material selected from the group consisting of glass, carbon, quartz, graphite, boron nitride, silicon carbide, aluminum, steel, oxide ceramics and basalt mineral.

14. The composite material of claim 10 wherein the preformed reinforcement material is provided in at least one form selected from the group consisting of fiber bundles, fabrics, non-wovens, fiber mats, wire meshes, perforated sheets, non-perforated sheets, sheet metal, sheet plates, fibers bonded with the alkali water glass and wire pieces bonded with alkali water glass.

15. The composite material of claim 11 wherein the preformed reinforcement material of plastic comprises a foamed plastic article.

16. The composite material of claim 10 wherein the preformed reinforcement material is provided in at least one form selected from the group consisting of a mat and a fabric, said mat comprising at least one member selected from the group consisting of glass fiber and mineral fiber, said fabric comprising at least one member selected from the group consisting of plastic fabric and plastic-coated fabric.

17. The composite material of claim 10 wherein the alkali water glass comprises at least one alkali water glass selected from the group consisting of sodium water glass and potassium water glass.

18. The composite material of claim 10 wherein the finely dispersed mineralic filler comprises at least one member selected from the group consisting of alumina, silica, zirconia, titanium dioxide, graphite, red mud, quartz flour, clay cement and kaolin, the finely dispersed mineralic filler having an average grain size of from 1 to 30 μm.

19. A composite material comprising:
  at least one preformed reinforcement material co-influencing a final shape of the compositie material, said preformed reinforcement material being made of at least one member selected from the group consisting of tension-resistant organic material and tension-resistant inorganic material; and
  a hardened material comprising alkali water glass and a finely dispersed mineralic filler, wherein said hardened material coats the preformed reinforcement material and is hardened by drying at 90° to 105° C. and subsequent tempering at 400° to 700° C.

20. The composite material of claim 19 wherein the at least one preformed reinforcement material comprises at least one member selected from the group consisting of hemp, cotton, jute, flax, silk, wool, cellulose and plastic.

21. The composite material of claim 20 wherein the plastic comprises at least one member selected from the group consisting of polyester, polyamide, polyethylene, polypropylene, polystyrene, poylurethane, polyvinylchloride, phenol formaldehyde resin and melamine formaldehyde resin.

22. The composite material of claim 19 wherein the preformed reinforcement material comprises at least one inorganic material selected from the group consisting of glass, carbon, quartz, graphite, boron nitride, silicon carbide, aluminum, steel, oxide ceramics and basalt mineral.

23. The composite material of claim 19 wherein the preformed reinforcement material is provided in at least one form selected from the group consisting of fiber bundles, fabrics, non-wovens, fiber mats, wire meshes, perforated sheets, non-perforated sheets, sheet metal, sheet plates, fibers bonded with the alkali water glass and wire pieces bonded with alkali water glass.

24. The composite material of claim 20 wherein the preformed reinforcement material of plastic comprises a foamed plastic article.

25. The composite material of claim 19 wherein the preformed reinforcement material is provided in at least one form selected from the group consisting of a mat and a fabric, said mat comprising at least one member selected from the group consisting of glass fiber and mineral fiber, said fabric comprising at least one member selected from the group consisting of plastic fabric and plastic-coated fabric.

26. The composite material of claim 19 wherein the alkali water glass comprises at least one alkali water glass selected from the group consisting of sodium water glass and potassium water glass.

27. The composite material of claim 19 wherein the finely dispersed mineralic filler comprises at least one member selected from the group consisting of alumina, silica, zirconia, titanium dioxide, graphite, red mud, quartz flour, clay cement and kaolin, the finely dispersed mineralic filler having an average grain size of from 1 to 30 μm.

* * * * *